July 30, 1946.  L. ALBIANI  2,405,004

CHAMFERING MACHINE

Filed April 22, 1943  2 Sheets-Sheet 1

Inventor:
Lido Albiani
by Joshua R. H. Potts
Attorney.

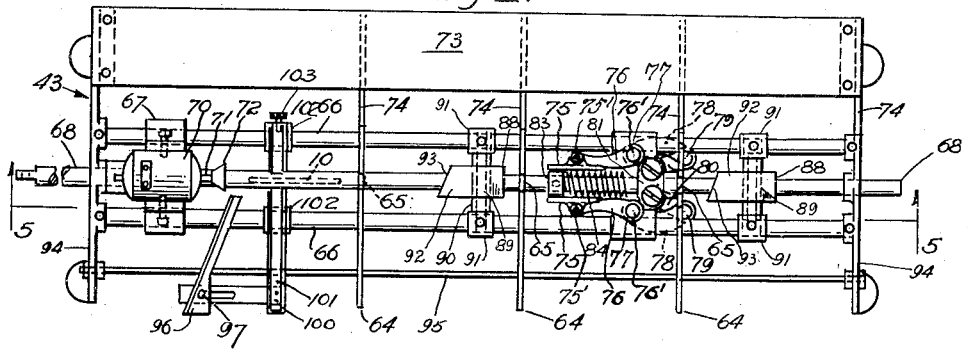

Patented July 30, 1946

2,405,004

UNITED STATES PATENT OFFICE 2,405,004

CHAMFERING MACHINE

Lido Albiani, Cicero, Ill.

Application April 22, 1943, Serial No. 484,037

2 Claims. (Cl. 29—33)

My invention relates to a device or machine for chamfering, beveling or tapering the ends of rectilinear lengths of material such as rods, wires or the like, for any purpose, such as for use as pivot axes, pins or shafts for various uses, such as to engage bearings for sensitive instruments in supporting rotatable parts or the like.

An object of the invention is to provide a device or machine having means to receive the lengths of material such as rods or suitable rectilinear or straight lengths of wire or the like; to automatically feed the same into position to be clamped and acted on by a suitable tool, such as a motor-driven chamfering tool or grinder held in a movable translating carriage and then to move the carriage and tool away from the wire, one with respect to the other, so that the tool engages and acts upon the adjacent end of the positioned rod or wire held by the clamp to chamfer, taper or otherwise act thereon, after which one element, such as the carriage and tool, is moved in the reverse direction to disengage or move the tool away from the work, and the work caused to be automatically discharged by the same motion of the tool and carriage, to be gathered for use or in bundles, and the device arranged to receive another length or piece of wire or work to be operated upon in similar manner, whereby the operation may be speeded up with efficiency, accuracy and dispatch.

Another object of the invention is to provide means for controlling the operation or reverse motion of the carriage and tool to properly engage and operate upon the work in one motion, and to be released or disengaged therefrom in the opposite motion, which also serves to discharge the lengths of wire after being operated upon.

The invention is also designed for use in connection with a wire or like straightening and cutting or shearing machine, by which wire of proper character is delivered from a suitable bundle or roll, such as from a reel on which it is coiled or wound, straightened as it is fed to the cutting or shearing means, to be cut into desired or given lengths, which leaves the ends with burrs and somewhat flattened out or square, but usually flat or beveled on two sides, and with a flat or straight edge portion at the ends instead of being chamfered, tapered or pointed in a conical, pin-like form capable of use as a bearing point.

The improvement per se or in combination with such a machine as above set forth or of suitable type, receives the wires so cut into desired lengths and acts on the ends, or at least on one end thereof, to chamfer or taper the same, first automatically feeding the same into position from the straightening and cutting device or machine and into the chamfer machine, automatically gripping or clamping the wire and holding the same in position against turning or moving rectilinearly or bodily shifting longitudinally; then chamfering or tapering the end thereof by bringing or moving a grinding or abrasive tool into position to act thereon, and then to release and discharge the length of wire or shaft constituting the work therefrom, for use or gathering and bundling for subsequent assembly in an instrument or the like, for use.

Another object of the invention is to provide means for individually or singly feeding the lengths of wire into position to be gripped and held for chamfering, and then for releasing and discharging the same.

Another object of the invention is to provide novel control means automatically actuated to cause reverse rectilinear movement of the chamfering tool, including a motor mounted on a carriage, to shift back and forth in engaging with and disengaging from the work.

Further objects and advantages will appear and be brought out more fully in the following specification, reference being had to the accompanying drawings, in which:

Fig. 4 is a top plan view of the chamfering device or machine with the clamping jaws in a released position.

Fig. 5 is a vertical sectional elevation, taken on the line 5—5 of Fig. 4.

Fig. 6 is a cross-sectional detailed view taken on the line 6—6 of Fig. 5.

Fig. 7 is a cross-sectional detailed view taken on the line 7—7 of Fig. 5.

Fig. 8 is a top plan view of a portion of the machine as shown in Fig. 4, illustrating the tool and clamping means, the latter being shown with the jaws closed.

Figure 1:
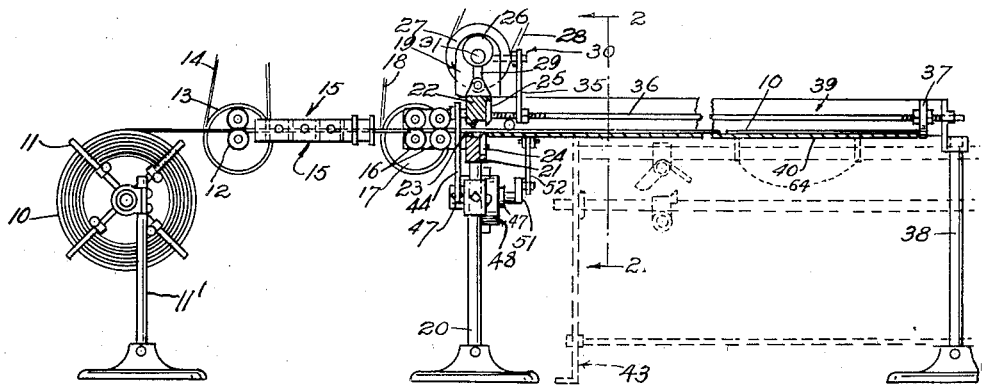
Fig. 1 is a sectional elevation showing the assembled wire straightening, shearing and feeding end of a machine for supplying lengths of wire to be chamfered with the chamfering machine or device indicated in dotted lines.
Figure 9:
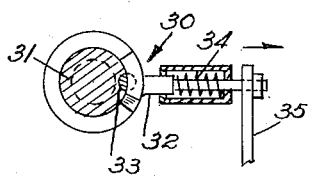
Fig. 9 is a detailed sectional elevation of a spring bolt clutch used for actuating the cutting or shearing mechanism.
Figure 2:
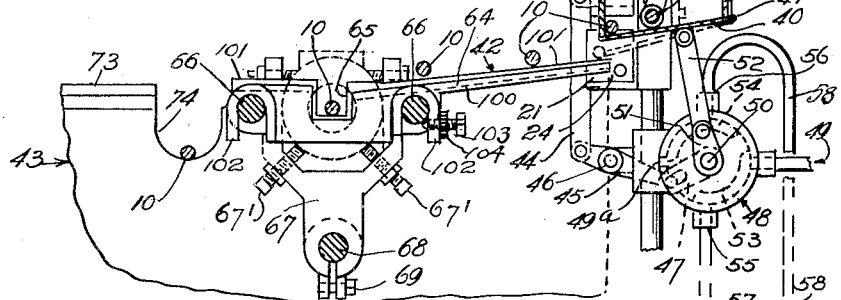
Fig. 2 is an enlarged fragmentary detailed section taken on the line 2—2 of Fig. 1, together with a diagrammatic illustration of the air control for actuating the chamfering tool, together with the clamping, releasing and discharge of the chamfered wire.

Referring to the drawings in detail, in which corresponding reference characters designate like parts throughout the several views, and more especially to Figs. 1 and 2, the material or work to be operated upon may be wire 10, coiled or wound upon a reel 11, rotatively supported at the entrance or feed end of the machine, such as upon a frame or stand 11¹, so as to be fed horizontally or otherwise in a rectilinear line into the machine, to be operated upon. The wire 10 is thus fed along to straightening and cutting or shearing means, to be cut into proper lengths and fed or discharged into the chamfering device or machine. As illustrated, the wire 10, adapted to be cut into suitable lengths for rods or shafts, may be of flexible spring or bendable wire adapted to stay straight when straightened or distended, and is delivered or comes in a horizontal line from the top of the feeding supply means or reel 11, although it is desired and understood that any material in suitable lengths may be acted upon.

The wire as shown is engaged by or passes between suitably driven friction-push rolls 12, shown operated by a pulley 13 and a belt 14, the rolls pushing the wire rectilinearly into and through a suitable straightening device 15 which takes out kinks or bends by proper friction, insuring proper, steady feeding and straightening thereof without unnecessarily retarding or gripping the wire.

From the straightening means 15, the wire then passes between suitably driven pull rolls 16, shown as two opposed pairs, or four in number, and, like the rolls 12, operated or driven in any suitable manner as by a pulley 17 and belt 18. The rolls 16 pull the wire 10 from the straightening device 15 and feed the same in properly straightened form into a cutting or shearing mechanism generally designated at 19, which is automatically actuated by the end of the rod or wire and controls the trap door or bottom of a hopper or box from which the cut lengths of wire are delivered into the chamfering mechanism, and includes a control means or air valve serving to operate a clamping means for holding a rod or wire while being chamfered or otherwise operated upon as by a chamfering tool held in a suitable carriage, and advanced against the work or one end of the wire, and then retracted or moved in a reverse position to disengage therefrom, release the clamp and then discharge the work or wire after being acted upon.

The cutting or shearing mechanism 19 is mounted upon a suitable frame or standard 20, and has a fixed lower member or anvil 21 and a movable upper member 22 and which form a bell mouth 23 to insure reception and guidance of the wire thereinto. The lower member 21 carries a knife or blade 24, and the upper movable member carries a knife or blade 25, both having beveled edges cooperating to shear the wire. The upper member and blade are reciprocated vertically in any suitable manner as by an eccentric or crank disk 26, which may be driven by a fly wheel pulley 27 from a belt 28 or otherwise, and pivotally connected by a link 29. A spring-bolt clutch 30 is designed to connect the pulley and eccentric to the shaft 31, including a clutching member 32 with a bolt 33 and a spring 34 normally holding the clutch disengaged, and a lever 35 which engages the clutch to actuate the upper member and blade automatically, as will be made apparent. This lever connects with a rod or wire 36, extending horizontally in the frame above the wire or rod 10 along the severed length thereof and connected to a set or adjustable stop wheel or disk 37, directly or through the medium of a lever or otherwise, and supported in the frame or by means of a standard 38. The stop or gage wheel formed by the disk 37 is adapted to be engaged by one end of the wire, which may be forced against the disk by feeding and the lower beveled end of the upper knife or blade 25, as shown in Fig. 1 of the drawings, as the wire is pulled along by the means heretofore described, so as to cause the same to be severed in proper rectilinear lengths within one lower corner of a hopper or box 39, into which the wire is fed. This box has a bottom drop or discharge door 40, which may be hinged as at 41 and inclined forwardly so as to retain the wire 10 or rod in the lower corner, as shown in Fig. 2, and to automatically fall or permit the same to drop out onto an inclined feed table or bed 42 of the chamfering machine or frame 43 thereof when opened downwardly. This discharge or drop door is automatically actuated at proper intervals in timed relation with the cutter mechanism and the advancing mechanism of the chamfering tool in any suitable way, and this may be effected through the medium of a link 44 pivotally connected to the movable upper member 22 and to one end of a lever 45 pivoted on the frame as at 46 and having its short arm pivotally connected to the link. The other or long arm of the lever 45 is pivotally connected to the arm or crank 47 of an air-control valve 48 comprising a cylinder having a suitable air supply source 49 for air or other fluid under pressure. The axis 50 of the air valve is connected to the arm 47 and also an arm 51, which is in turn connected by a link 52 to the door 40 to open and close the latter as the valve is rotated or oscillated to bring its peripheral ports 53 and 54 into registration with the air inlet 49 and diametrically opposite outlets 55 and 56 connected by conduits 57 and 58 to opposite ends of a working cylinder 59. A piston 60 reciprocates in the cylinder 59 and is alternately moved in opposite directions by the reversing of the direction of the flow of air through the valve 48 from the actuation of the upper cutting blade as it moves alternately up and down so as to reciprocate the piston rod 61 through a head 62 and which in turn is provided at 63 for connection to a reciprocating rod (to be later described), slidably mounted in the frame 43 of the chamfering machine.

As before stated, this chamfering machine has an inclined feed table 42 which may be formed of inclined bars 64 beneath the hopper or box 39, as shown more particularly in Fig. 2 of the drawings, so as to receive the cut lengths of wire or rods therefrom to roll down bars 64 into aligned recesses or notches 65 therein, in position to be acted upon.

The frame 43 has a pair of guide rods or tracks 66, between which the notches 65 and the wire bar 10 are equidistantly disposed, and the guide rods support a sliding carriage 67 in connection with a sliding or translating rod or shaft 68 beneath the notches or recesses 65 and centrally between the guide rolls.

The carriage 67 may be adjustably clamped along the length of the shaft or rod 68 as indicated at 69 and carries the chamfering tool, which may include a suitably driven motor such as an electric motor 70, the shaft 71 of which may take a chuck for supporting the chamfering or like tool 72. The carriage 67 which receives the motor 70 or base thereof may be clamped in position and raised or lowered at either or both sides by adjustment set screws 67¹. The motor may be independently or simultaneously controlled, or ordinarily may simply be connected to its circuit to constantly rotate during the operation of the machine.

The rods 66 serve to support the carriage 67 at one end of the frame 43 and also support the bars 64 through which the rods pass while the discharge ends of the bars 64 are connected to a plate or table 73, adjacent which the bars 64 are recessed, as shown at 74, to receive the lengths of wire being chambered and discharged from the recesses or notches 65.

In order to clamp and hold the cut lengths of wire or rods discharged from the hopper 39 into the notches 65, and while so positioned therein, suitable clamping means are carried by the guide rods 66 and actuated by the movement of the shaft or rod 68. This clamping means may include opposed pivoted jaws 75, pivoted intermediately as at 75¹ to arms 76 pivotally supported at 76¹, so that the opposed flat gripping surfaces of the jaws are at the same elevation with the notches 65 and in alignment therewith. The pivots 76¹ of the arms 76 extend downwardly through vertical bearings 77 and have arcuate arms 78 pivotally connected at their free or outer ends, as shown at 79 to links 80 in turn pivoted to a sliding collar 81 loosely mounted on the central horizontal shaft or rod 68. If desired, the collar 81 may be made separable to facilitate mounting, repair or replacement as indicated at 82. An adjustable set collar 83 is also mounted on the rod 68, as is an expansible coil spring 84 between the collar 83 and the sliding collar 81. The spring may move away from the collar 81 but is pressed against the same by the collar 83 upon movement of the rod 68 to the right, as shown in Figs. 4, 5 and 8 of the drawings. This will shift the collar 81 in the same direction and swing the outer ends of the links 80 outwardly to impart corresponding movement to the arms 78 and close the jaws 75 in position to grip the rod or length of wire and hold the same in position, to be acted upon by the tool. The tool 72 is thus advanced to the right in Fig. 3 or to the left in Fig. 2 by the inward movement of the rod 68 as the air is admitted in front of the piston 60 upon the downward movement of the cutter blade 25 to partially turn the air valve 48 and align the port 54 with the inlet 49 and the outlet 56, so that air will be conducted by the hose or pipe constituting the conduit 58 to the forward end of the cylinder 59.

Figure 3:
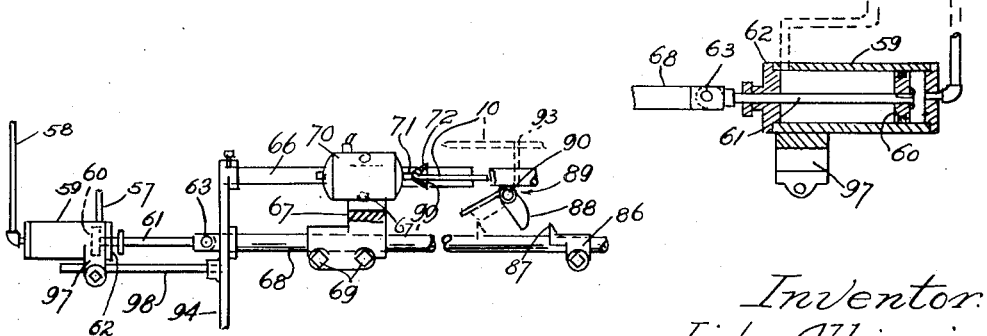
Fig. 3 is a detailed fragmentary elevation showing the application of the air control for actuating the chamfering tool and moving the same forwardly, together with the tripping or discharging means.

Reverse movement is imparted to the rod 68 upon the upward movement of the cutter blade 25 which rotates the oscillatory air valve 48 in the opposite direction to align the port 53 with the inlet 49 and the outlet 55 to allow the air or fluid under pressure to pass through the conduit 57 and into the cylinder 59 on the other side or in back of the piston 60 to cause movement of the rod 68 to the left in Fig. 3 or to the right in Fig. 2. At this time the air in front of the piston 60 is exhausted through the conduit 58 and the port 54 through an exhaust port 49a by reason of the port 54 connecting the outlet 56 with the exhaust port 49a. Likewise, when the port 54 connects the inlet 49 to the outlet 56 and conduit 58, the port 53 is moved to connect the pipe 57 at the outlet 55 to the exhaust port 49a and permits exhaust of air in front of the piston 60 during the forward or outward movement thereof to the left in Fig. 3 or to the right in Fig. 2.

Also mounted on the rod 68 is an adjustable collar 85, which on the opposite movement of the rod 68 to the left (Figs. 4, 5 and 8), engages the slidable collar 81 to swing the links 80 inwardly and impart corresponding movement to the arms 78, and thereby swing the jaws 75 outwardly in opposite directions to open the gripping or clamping means. Adjustable trip members 86 are also mounted on the rod 68 and have upwardly extending abutments 87, which may be tapered if desired and are adapted to engage weighted arms 88 of bell crank levers or right angular wire discharging members 89 pivoted at 90 in bearings 91 carried by the guide rods or tracks 66. The arms of the levers 89 constituting the wire-discharging members are preferably flat, and the arms 92 thereof are beveled as at 93, so that when swung upwardly by engagement of the trip members 86 through the medium of their abutments 87 engaging the weighted arms 88, the beveled edges will be disposed in inclined positions toward the recesses 74 to raise the rod from the released gripping means or jaws 75 and notches 65, to discharge the rod or wire, after being chamfered, into the recesses 74 upon the movement of the rod 68 to the left, as the chamfering tool moves in the same direction away from the end of the rod which has been acted upon. After the abutments 87 move past the weighted arms 88, the latter will drop by their weight to swing the arms 92 downwardly below the guide rods 66 and below another rod or length of wire discharged from the box or hopper 39 after being severed by the cutting mechanism and the opening of the drop door 40 as previously described. The actuation of the discharge levers is substantially simultaneous with the engagement of the collar 85 with the slidable collar 81 which opens the jaws 75 but may be subsequent thereto, the point being that the arms 92 must not push upwardly on the rod or length of wire being acted upon prior to the release of the jaws, and the compression of the spring 84 by engagement of the collar 81 therewith tends to shift the rod 68 to the left to allow subsequent expansion of said spring, which cushions the engagement thereof with the slidable collar 81 in opening the jaws 75, and thus the collar 85 engages the collar 81 to open the jaws as previously explained. When another length of wire is received in the notches 65, the rod 68 is moved to the right to advance the chamfering tool against the adjacent end of the wire, and the abutments 87 engage the weighted arms 88 and move past the same by swinging the weighted arms slightly upwardly and the other arms 92 downwardly. This disposes the abutments 87 to the right of the arms and spaced therefrom so as to be in a position to again actuate the levers 89 on the reverse movement of the rod 68 to the left for the purpose of swinging the arms 92 upwardly and discharge the next wire, so that this action is repeated quickly and positively by the constant reciprocation of the rod 68 under control of the air valve from the cutting or shearing mechanism, and without manual intervention.

The table 73 may serve for the purpose of gathering the wires which have been acted upon, for subsequent use in an instrument or otherwise. If it is desired to operate upon the opposite ends of the wires, they are merely dropped into the notches 65 without cutting additional lengths, or fed into the hopper 39 for discharge therefrom singly, to be acted upon in the same manner as described.

The frame 43 may have end plates 94 connected by rods 95 in addition to the guide rods 66 and the table 73, and an inclined end gage 96 adjustably supported at 97¹, may be provided to receive the severed end of the wire, and since this gage is preferably of right angular or flanged formation in cross-section and converges slightly toward the adjacent bar 64 of the frame, it will assist in guiding the lengths of wire into proper position lengthwise in the notches 65 of the chamfering or tapering machine.

Suitable means may also be provided to regulate and limit the movements of the reciprocatory rod 68 such as by the adjustment of the carriage 67 and engagement of the sleeve or collar thereon, with the bearing member at the corresponding end plate or member 94 of the frame 43, or otherwise.

The cylinder 59 may be provided with an adjustable collar 97 (Figs. 2 and 3) to regulate the movement of the shaft or rod 68 by adjustably mounting the cylinder on a horizontal rod 98 at one end of the frame beneath the rod 68 and the piston rod 61, so that proper actuation of the wire-gripping and releasing means, the chamfering tool with respect to the end of the wire and the discharge means for the latter may be regulated and their cooperative relation insured, so that proper chamfering or tapering of the ends of the wires 10 may be carried out as indicated at 99 in Fig. 3 of the drawings.

It will thus be seen that the feeding of the wires, the straightening thereof and the cutting of the wires into proper lengths, together with the pressure-actuated means for causing the operation of the cutting or shearing mechanism by the pressure exerted from the feeding and cutting of the wire, together with the discharge of the lengths of wire as cut, and feeding thereof into position to be acted upon, together with the clamping and chamfering of the end thereof, and the release and discharge of the wires, is automatic and properly regulated in successive timed relation, whereby the operation may be speeded up with greater and more economical production than can be accomplished by hand or with known methods. The pressure is also regulated, so that the wires are not bent, but will be maintained in their straight or rectilinear condition, and the ends properly acted on, so as to provide tapered or conical bearings for the ends of the wires, for subsequent use.

It may also be mentioned that the sequence of operation subsequent to the cutting and feeding of the wires from the hopper or box may be such that as the wires are severed after pressure is exerted on the wheel or disk 37 to actuate the spring bolt clutch 30, and then release the same for connecting and disconnecting the driving eccentric which reciprocates the upper cutting blade 25, from the shaft 31, the jaws 75 are opened to receive a length of wire fed by gravity upon opening the trap door 40 by rolling down the inclined bed 42. The jaws then grip the wire as the carriage and tool move forwardly to engage the end of the wire and chamfer the same after the wire is gripped and held in position. The tool then chamfers the end of the wire with the jaws closed and holding the wire firmly in position and against rectilinear movement. The trips 87 then engage the levers 89 after the collar 85 has engaged the sliding collar 81 to release the jaws 75 of the gripping or clamping means, so as to raise the arms 92 and elevate the wire from the notches 65 and caused to roll down the beveled edges 93 into the trough or recesses 74.

If desired, the inclined bar 64 adjacent the motor 70 and the end of the wire 10, acted upon by the tool, may be formed as shown in Fig. 2 of a channel iron member 100 in which a wood or like cushion filler 101 is disposed, with the notch 65 in the top of both. This bar terminates at or adjacent the table 73 and is slidably mounted on the guide rods on racks 66 as by means of inverted U-shaped jaws or clamps 102, which are slidable on the rods 66 and one of which may be held in adjusted position as by a set screw 103 having a knurled head and a lock nut 104; this cushion bar prevents scratching or injury to the wire where it is pressed by the motor tool.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as new and desire to secure by Letters Patent is:

1. The combination with means for feeding and straightening a length of wire, means for cutting the wire into suitable lengths after being straightened, means actuated by the feeding of the wire to cause closing and opening of the cutting means by pressure exerted in the feeding movement, means to release the wires as cut, means to receive and clamp the wires individually as fed thereto, a reciprocating motor-driven chamfering tool, air-operated means for reciprocating the tool, control means for said air-operated means, actuated by the operation of the cutting means, to advance the tool upon the cutting of the wire and to reverse the movement of the tool upon the feeding of the wire when the cutting means is open, said means serving to automatically release a cut length of wire and to feed the same by gravity into the clamping means, means operated by the tool-reciprocating means to actuate the wire-clamping means for action on the wire end by the tool on advance thereof, and to release the same, upon opposite movement of the tool, and means also operated by said reciprocating means to raise and cause discharge of the wire to one side of the clamping means.

2. In combination with a hopper having a discharge means, means to cut and deliver lengths of wire or the like to the hopper, means actuated by the cutting and delivering means to operate the discharge means, a chamfering device including a frame having wire-receiving and holding means, means to cushion the engagement of the holding means, said device including inclined feed-bars having notches for receiving the lengths of wire from the discharge means for engagement by the holding means, one bar having a cushion and being adjustable according to the lengths of the wires, said chamfering device having a motor-driven chamfering tool movable to act on the end of the wire while held away from the same, and means operable with the latter movement to release the holding means and discharge the wire, said tool and latter means being operable by and controlled from the cutting and delivering means, said motor-driven tool being adjustable in alignment with the end of the wire in position to be acted upon.

LIDO ALBIANI.